United States Patent [19]
Lomelino et al.

[11] Patent Number: 5,867,675
[45] Date of Patent: *Feb. 2, 1999

[54] APPARATUS AND METHOD FOR COMBINING DATA STREAMS WITH PROGRAMMABLE WAIT STATES

[75] Inventors: Lawrence W. Lomelino, Folson, Calif.; Ryan A. Callison, Spring, Tex.

[73] Assignee: Compaq Computer Corp, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 692,488

[22] Filed: Aug. 6, 1996

[51] Int. Cl.$^6$ ............................................. G06F 13/00
[52] U.S. Cl. ........................................ 395/309; 395/308
[58] Field of Search .................................. 395/308, 309, 395/297, 304

[56] References Cited

U.S. PATENT DOCUMENTS

| | | |
|---|---|---|
| 5,469,577 | 11/1995 | Eng et al. ............................ 395/297 |
| 5,557,758 | 9/1996 | Bland et al. ......................... 395/308 |
| 5,613,075 | 3/1997 | Wade et al. .......................... 395/287 |
| 5,721,839 | 2/1998 | Callison et al. ..................... 395/308 |
| 5,727,207 | 3/1998 | Gates et al. ........................ 395/651 |
| 5,727,218 | 3/1998 | Hotchkin ............................. 395/733 |
| 5,734,881 | 3/1998 | White et al. ........................ 395/585 |
| 5,740,400 | 4/1998 | McDermott .......................... 395/556 |

*Primary Examiner*—Ayaz R. Sheikh
*Assistant Examiner*—David A. Wiley
*Attorney, Agent, or Firm*—Jenkens & Gilchrist

[57] ABSTRACT

A system for transferring data includes structure (i.e, hardware, software, a combination thereof) for requesting data from a second bus, which data is destined for a first bus; and structure for gaining ownership of the second bus for the purpose of transferring the data from the second bus to the first bus, which structure includes substructure for waiting a programmably variable amount of time to see if additional data is requested by the first bus, before relinquishing control of the second bus.

11 Claims, 4 Drawing Sheets

APPARATUS AND METHOD FOR COMBINING DATA STREAMS WITH PROGRAMMABLE WAIT STATES

BACKGROUND OF THE INVENTION

1. Field of the Invention

The present invention relates to apparatus and methods for transferring data between devices in a computer system. More particularly, the present invention relates to apparatus and methods for maintaining a data stream between devices that handle data differently.

2. Description of the Related Art

In computer systems, there frequently arises a need to transfer data efficiently between devices. Meeting this need may be complicated by various factors.

One complicating factor may be use of different formats—e.g., big-endian versus little-endian—for ordering data. In computer systems where the central processing unit is an Intel 80×86 processor, the data format used is typically the little-endian format. Nonetheless, peripheral devices which are based on the big-endian format are sometimes used in the 80×86-processor-based computer systems. To function properly, there must be "bridging" circuitry capable of performing little-endian/big-endian data format conversion.

Another complicating factor may be different data handling speeds. It is, for example, difficult to efficiently stream data from a bus in which data is moving at a first speed, to a bus on which data moves at a second, different speed.

Yet another complicating factor may be difficulties that arise in respecting continuity of data. For example, if the total length of an intended transfer of data is unknown; for example, in a case where data is sent in bursts on the one hand, and transferred in a clocked stream on the other; it is difficult to systematically detect and maintain contiguous blocks of data.

Complicating factors such as those set forth above have hampered efforts to design perfectly efficient apparatus and methods for transferring data between devices in computer systems. At the same time, development of devices that reflect improvements in data handling, and that have an associated end to be coupled to preexisting devices, has created many situations in which improved data transfer schemes would be helpful. A prime example of this has arisen in the Fibre Channel/computer interface arena. In that interface it is necessary to bridge data between a Peripheral Component Interconnect ("PCI") bus and a Tachyon System Interface ("TSI") bus. Towards this end, Hewlett Packard has published a "Tachyon TSI to PCI Bus Gasket Application Note," ver. 1.0, the express purpose of which is "to present an intermediate discrete solution to interface Hewlett-Packard's Tachyon Fibre Channel Controller to a standard version 2.0 compliant PCI bus." This application note prescribes a three chip solution, presented with the statement that "[t]he interface is not intended to be an end-all solution but is intended to be a starting point for developing a fibre channel solution that includes Tachyon." Thus, it is clear that even Hewlett-Packard itself, the manufacturer of the Tachyon Fibre Channel controller, recognizes the need for, but is not yet satisfied with, TSI/PCI bridges. Bridging TSI and PCI buses requires providing a solution to all three complicating factors mentioned above, that is, data format conversion, speed conversion, and recognition of continuous or contiguous data so that bandwidth can be used efficiently. Although, frankly, several good solutions have been proposed for the big-endian/little-endian conversion requirement, good solutions have not yet been developed for the "speed" and "recognition" problems mentioned above.

In light of the foregoing it is a shortcoming and deficiency of the prior art that there has not heretofore been developed apparatus and methods especially well suited for efficiently bridging certain buses, such as the PCI and TSI buses, especially insofar as speed conversion and respect for continuity of data are important components of such apparatus and methods.

SUMMARY OF THE INVENTION

The present invention overcomes the aforementioned shortcoming and deficiency by providing a system for transferring data, the system for transferring including means for requesting data from a second bus, which data is destined for a first bus; and means for gaining ownership of the second bus for the purpose of transferring the data from the second bus to the first bus, which means for gaining ownership includes means for waiting a programmably variable amount of time to see if additional data is desired by the first bus, before relinquishing ownership of the second bus.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION

The present invention can best be understood by describing an exemplary embodiment of it, which is what is done hereinbelow. So that all aspects of the structure and operation of the exemplary embodiment can be understood, the description below addresses three distinct, but related topics. First, there is a discussion of an environment, or an application, in which the teachings of the present invention may be employed. This discussion focuses on a TSI-PCI bridge, and where and how it can be usefully employed. Second, there is a discussion of the TSI and PCI buses, and certain TSI and PCI signals. This discussion is useful insofar as it provides typical tools that can be employed in constructing bridging circuitry according to the teachings of the present invention. Third, there is a discussion of actual operation of an embodiment of the present invention.

THE TSI-PCI ENVIRONMENT—AN ENVIRONMENT IN WHICH THE PRESENT INVENTION MAY BE USEFULLY EMPLOYED

Figure 1:
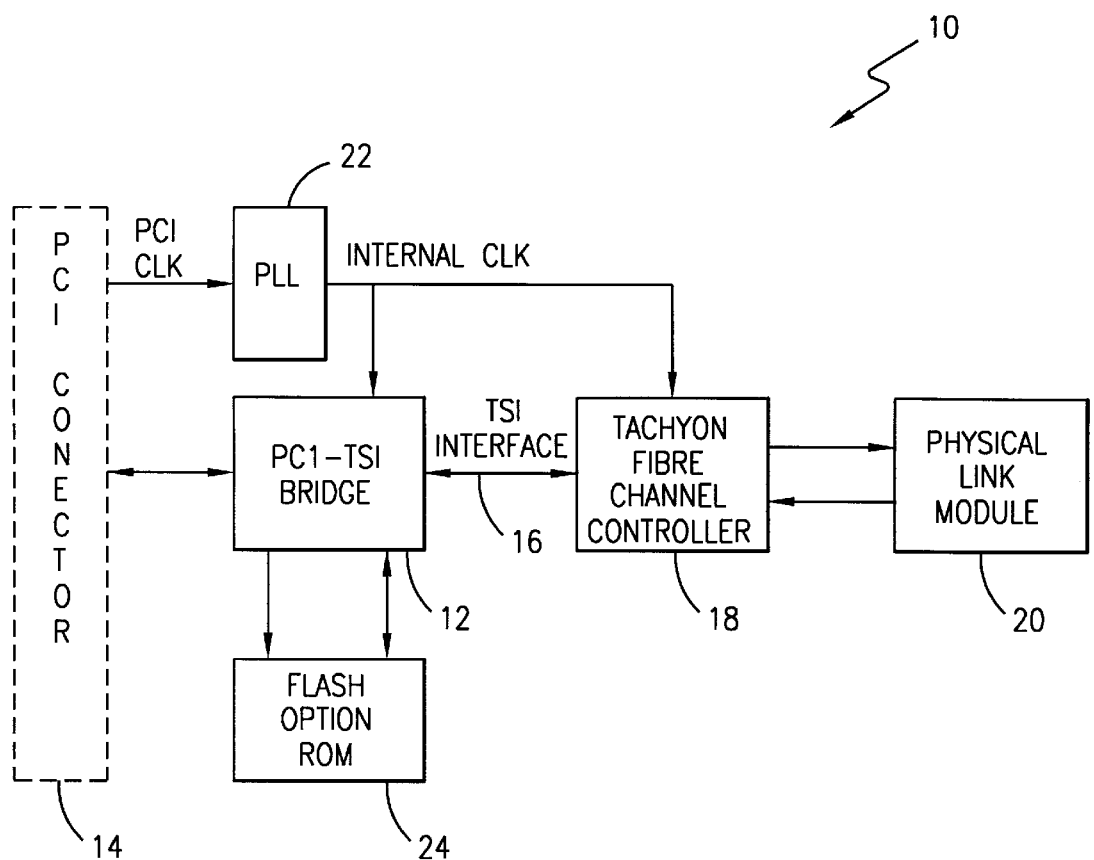
FIG. 1 depicts a bridge in an application, which bridge includes means for operating in accordance with the teachings of the present invention.

Referring now to the Drawings wherein like or similar elements are designated with identical reference numerals throughout the several views, and wherein the various elements depicted are not necessarily drawn to scale, and, in particular, to FIG. 1, there is shown a block diagram of a Fibre Channel controller card 10. The Fibre channel controller card 10 includes a PCI-TSI (Peripheral Component Interconnect-Tachyon System Interface) bridge 12, which is connected on one side to the PCI network connector 14. The PCI-TSI bridge 12 is also connected through a TSI bus 16 to a Tachyon Fibre Channel controller 18. The Fibre Channel controller 18 performs the necessary control functions for transferring data between a computer system (e.g., from computer system memory) and a network communications channel (not shown) according to the Fibre Channel Physical and Signalling Interface Specification, Revision 4.3 (June 1994). Connected to the Fibre Channel controller 18 is a physical link module 20 for connection to the Fibre Channel communications network, which can be formed of either fiber optics or copper wires. A clock generator 22 receives the PCI clock PCICLK and generates an internal clock to the PCI-TSI bridge 12 and the Fibre Channel controller 18. Optionally, a flash ROM 24 can be connected to the PCI-TSI bridge 12 for storing configuration information for the Fibre Channel controller card 10.

Figure 2:
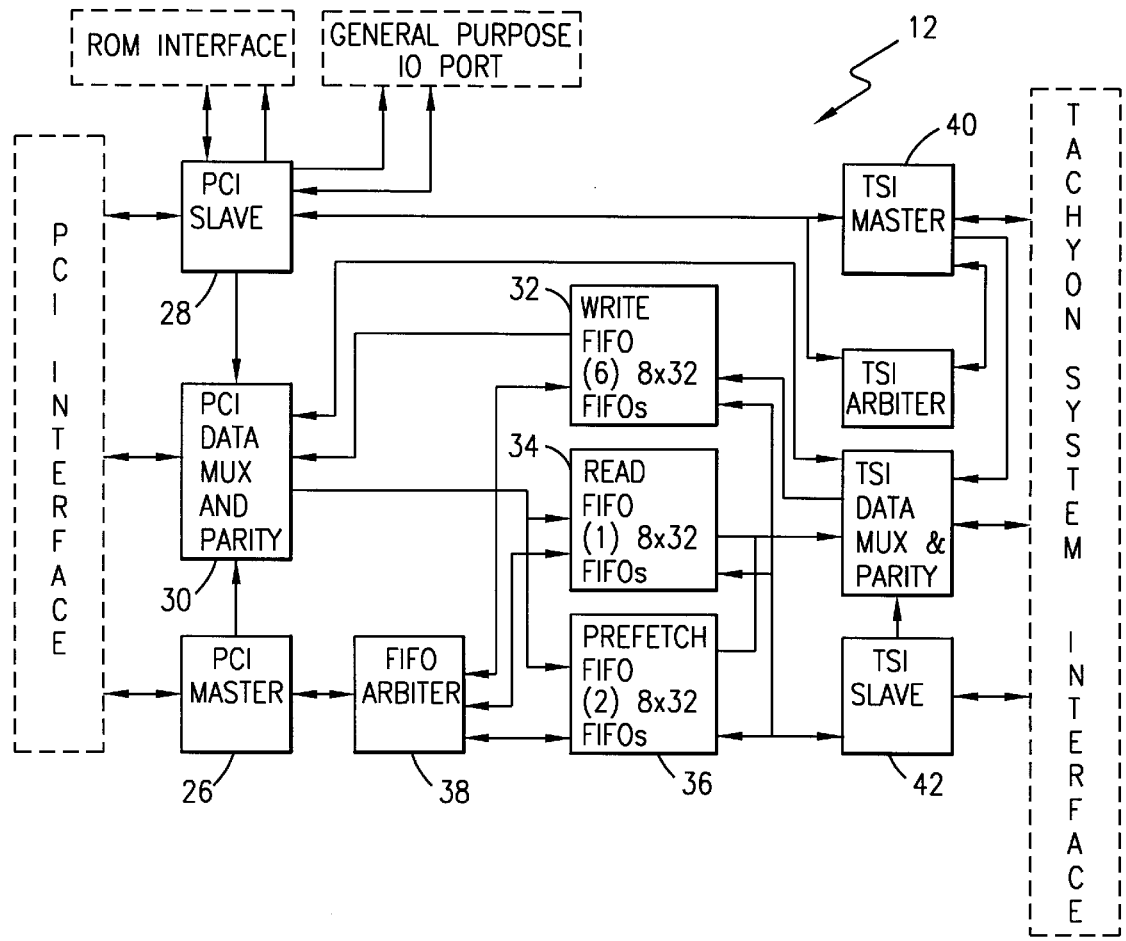
FIG. 2 is a block diagram of components of the bridge depicted in FIG. 1.

Referring now to FIG. 2, a block diagram of the PCI-TSI bridge 12 is shown. On the PCI side of the PCI-TSI bridge 12, a PCI master 26 and a PCI slave 28 are included to perform the necessary master and slave functions on the PCI bus. PCI address, data and parity information are routed between a PCI interface block 30 and the PCI bus. The PCI-TSI bridge 12 also includes write FIFOs 32, a read FIFO 34 and prefetch read FIFOs 36. In the preferred embodiment, six write FIFOs 32 are included, with each write FIFO organized as 32 bits wide and 8 entries deep. The write FIFOs 32 are used to store write data from the Fibre Channel controller 18 destined to computer system memory. By using the write FIFOs 32, a burst data transfer rate of 106 Mbytes per second can be achieved in the preferred embodiment on writes to the PCI bus.

Only one read FIFO 34 is used, and it is organized as 32 bits wide and 8 entries deep. The bridge 12 also includes two prefetch read FIFOs 36, with each prefetch read FIFO also organized as 32 bits wide and 8 entries deep. The read FIFO 34 and prefetch read FIFOs 36 receive data signals, ADI<31:0> from the PCI interface block 30. During read cycles from the PCI bus, the Fibre Channel controller 18 can prefetch data from system memory. By using the prefetch read FIFOs 36, a burst data transfer rate of 88 Mbytes per second can be achieved in the preferred embodiment on reads from the PCI bus. The read FIFO 34 is used for non-prefetch reads by the Fibre Channel controller 18.

A FIFO arbiter 38 determines which of the write FIFOs 32 or read FIFOs 34 or 36 have priority for the PCI master 26. If a TSI-to-PCI cycle is pending in the write FIFOs 32 and the Fibre Channel controller 18 concurrently requests a read cycle on the PCI bus, the FIFO arbiter 38 arbitrates between the concurrent write and read requests. In the preferred embodiment, the write FIFOs 32 are always given the highest priority by the FIFO arbiter 38.

On the TSI side of the PCI-TSI bridge 12, a TSI master 40 and a TSI slave 40 are included to perform the master and slave functions on the TSI bus. The TSI master 40 receives the PCI data signals ADI<31:0>. from the PCI interface block 30. The TSI master 40 provides data bits TM-TAD<31:0> to a TSI interface block 44, which reroutes address, data and parity information to and from the TSI bus 308. The TSI interface block 44 also receives data bits TS-TAD<31:0> from the TSI slave 42. Also on the TSI side of the PCI-TSI bridge 12 is a TSI arbiter 46, coupled to PCI slave 28 and TSI master 40, to perform arbitration therefor.

In the preferred embodiment, the Fibre Channel controller 302 transfers data according to the big-endian format. Thus, if a write or read operation between the Fibre Channel controller 18 and the PCI bus involves data, then a big-endian/little endian data format conversion is performed. As previously mentioned, solutions have already been proposed to accomplish such conversion; therefore, it is not discussed further herein.

In the preferred embodiment, required PCI-TSI bridge 12 registers are mapped to memory, with predetermined addresses, where they can be read from and possibly written to as appropriate. There would typically be, for example, a PCI Configuration Command Register, for control over the bridge's ability to respond to or generate PCI cycles. This register could have configuration byte address offset 04h, for instance, a size of 16 bits, and an access privilege status of PCI configuration read/write. Another possible register, present in the exemplary embodiment of the present invention, is a PCI latency timer register which specifies, in terms of PCI clocks, the value of a latency timer of bridge 12 PCI master operations. In the exemplary embodiment, there are 8 bits, the upper 5 of which are read/write, and the lower 3 of which are fixed to zero and read only, giving an 8 clock resolution. Other such registers, configured and operating conventionally, can easily be incorporated into embodiments of the present invention by those skilled in the art.

THE PCI AND TSI BUSES

At this point it should be clear that the present invention is concerned with "bridging" devices that differ with respect to one or more of the following: data formatting; speed of handling; and respecting of data continuity. For convenience, the instant invention is being described in terms of its incorporation into an environment that requires all three of those "complication factors" to be handled: that is a PCI-TSI bridging environment.

The PCI-TSI bridging environment is a particularly good one to consider here because it presents tools (e.g., certain signals) that are conventional enough that the same or similar tools can be identified and used in other environments by those skilled in the art to practice the instant invention therein. Set forth below, therefore, is a discussion of the PCI and TSI interfaces.

THE PCI BUS

A PCI bus is a physical interconnect apparatus intended for use between highly integrated peripheral controller components and process/memory systems. A PCI bus is intended as a standard interface at the component level in much the same way that ISA, EISA, or Micro Channel buses are standard interfaces at the board level. Just as ISA, EISA, and Micro Channel buses provide a common I/O board interface across different platforms and different processor generations, the PCI bus is intended to be a common I/O component interface across different platforms and different processor generations.

The specification for the PCI bus is intended to standardize a local bus on which a large variety of I/O components can directly connect without "glue" logic, i.e., direct component interconnection.

The PCI bus uses a number of system signals, including the following:

A CLK signal (signal 50 in FIG. 3) provides timing for all transactions on the PCI bus and is an input to every device. All other PCI bus signals are sampled on the rising edge of the CLK signal, and all other timing parameters are defined with respect to this edge.

AD (Address and Data) signals (element 52 in FIG. 3) are multiplexed on the same pins of the PCI bus. During the first clock of a transaction, the AD signals contain a 32-bit target device address. During subsequent clocks, the AD signals contain up to 4 bytes of data.

C/BE (Bus Command and Byte Enable) signals (element 54 in FIG. 3) are also multiplexed on the same pins of the PCI bus. During the address phase of a transaction, the C/BE signals define a bus command. During the data phase of the transaction, the C/BE signals are used as "Byte Enables" for the 32 AD signals. The Byte Enables determine which byte lanes, i.e., 8-bit groups, of the AD signals carry meaningful data. For example, the C/BE[0] signal applies to byte 0 of the AD signals, and the C/BE[3] signal applies to byte 3 of the AD signals.

A FRAME (Cycle Frame) signal (signal 56 in FIG. 3) is driven by the current master device to indicate the beginning of an access. The FRAME signal is asserted to indicate a bus transaction is beginning. While the FRAME signal is asserted, data transfers continue. When the FRAME signal is de-asserted, the transaction is in the final data phase.

A TRDY (Target Ready) signal (signal 58 in FIG. 3) indicates the target device's ability to complete the current data phase of the transaction. The TRDY signal is used in conjunction with the IRDY signal described below. A data phase is completed on any clock where both the TRDY and IRDY signals are asserted. During a read, the TRDY signal indicates that valid data is present on the AD signals. During a write, the TRDY signal indicates that the target device is prepared to accept data. Wait cycles are inserted until both the IRDY and TRDY signals are asserted together.

IRDY (Initiator Ready) signal (signal 60 in FIG. 3) indicates the initiating device's (master device's) ability to complete the current data phase of the transaction. The IRDY signal is used in conjunction with the TRDY signal. As previously mentioned, a data phase is completed on any clock where both the IRDY and TRDY signals are asserted. During a write, the IRDY signal indicates that valid data is present on the AD signals. During a read, the IRDY signal indicates that the master device is prepared to accept data. Also as previously mentioned, wait cycles are inserted until both the IRDY and TRDY signals are asserted together.

A STOP signal (element 62 in FIG. 3) indicates the current target is requesting the master device to stop the current transaction.

An IDSEL (Initialization Device Select) signal (signal 64 in FIG. 3) is used as a chip select in lieu of the upper 24 address lines during configuration and read and write transactions.

A DEVSEL (Device Select) signal (element 66 in FIG. 3), when actively driven, indicates that the driving device has decoded its address as the target device for the current transaction. As an input, the DEVSEL signal indicates whether any device on the bus has been selected.

A REQ (Request) signal (element 68 in FIG. 3) indicates to a central bus arbiter that the device desires use of the bus. The REQ signal is a point-to-point signal, and every master device and master-slave device has its own REQ signal connection with the arbiter.

A GNT (Grant) signal (element 70 in FIG. 3) indicates to the device that access to the bus has been granted by the arbiter. The GNT signal is a point-to-point signal, and every master device and master-slave device has its own GNT signal connection with the arbiter.

In order to minimize access latency, the PCI specification uses an arbitration approach to bus transactions that is access-based, rather than time-slot-based. Thus, a master device must arbitrate for each access it performs on the bus.

Preferably, a central arbitration scheme is used, wherein each master device has a unique request (REQ) and grant (GNT) signal connected to the central arbiter device. A simple request-grant handshake between the arbiter and the master device is used to gain access to the bus.

A specific arbitration algorithm must be implemented by the arbiter, e.g., priority, rotating priority, fair, etc. An arbitration algorithm must be defined to establish a basis for a worst case latency guarantee. The arbitration occurs during a previous access so that no PCI bus cycles are consumed due to the arbitration algorithm. The arbiter can implement any scheme as long as only a single GNT is asserted on any clock.

A device requests the bus by asserting its REQ signal. When the arbiter determines a device may use the bus, it asserts the device's GNT signal. The arbiter may de-assert a device's GNT signal on any clock. Therefore, a device must ensure its GNT is asserted on the clock edge it wants to start a transaction. If the GNT signal is de-asserted, then the transaction must not proceed.

The GNT signal normally gives a device access to the bus for a single transaction. If the device desires another access, it should continue to assert its REQ signal. A device may de-assert its REQ signal anytime, but the arbiter may interpret this to mean the device no longer requires use of the bus and may de-assert the device's GNT signal.

The PCI bus may use "arbitration parking," wherein the arbiter asserts the GNT signal to a selected device when no device is currently using or requesting the bus. The arbiter can select this default owner any way it wants (e.g., fixed, last used, etc.) or can choose not to park at all, thereby effectively designating itself as the default owner. When the arbiter asserts a device's GNT signal and the bus is idle, that device must enable its AD and C/BE signal buffers. This requirement insures the arbiter can safely park the bus at some device and know that the bus will not float. If the arbiter does not park the bus, the central resource device in which the arbiter is embedded typically drives the bus, i.e., effectively designating the central resource device as the default owner of the bus.

If the bus is idle and the arbiter de-asserts a device's GNT signal, the device has lost access to the bus, except in one case. The one case is when the arbiter de-asserts the GNT signal coincident with the device asserting the FRAME signal. In this case, the device will continue the transaction. Otherwise, the device must tri-state the AD and C/BE signals. The device must disable all buffers in a single clock to avoid possible contention with the next bus owner.

After bus ownership has been granted to a master device, the FRAME signal is asserted by being driven to a low voltage by the master device to indicate the beginning of the transaction. The first clock edge on which the FRAME signal is asserted is the address phase, and the address and bus command code are transferred by the AD and C/BE signals on that clock edge. The next clock edge begins the first of one or more data phases, during which data is transferred by the AD signals between the master device and the target device on each clock edge for which both the IRDY and TRDY signals are asserted by the master device and the target device, respectively. Wait cycles may be inserted in a data phase by either the master device or the target device with the IRDY and TRDY signals.

At such time as the master device intends to complete only one more data transfer (which could be immediately after the address phase), the FRAME signal is de-asserted and the IRDY signal is asserted indicating the master device is ready. After the target device indicates the final data transfer, by asserting the TRDY signal, the PCI bus returns to the idle state with both the FRAME and IRDY signals de-asserted.

A more complete discussion of the PCI bus is available in the document Peripheral Component Interconnect (PCI), Revision 1.0 Specification, Jun. 22, 1992, incorporated by reference herein.

THE TSI BUS

TSI is the interface to Hewlett Packard's Tachyon Fibre Channel interface controller. Fibre Channel is a multi-topology, physical transport channel that supports both networking and mass storage interconnections. Further information regarding Fibre Channel can be found in the work product of ANSI, Task Group X3T11, at CERN's (Geneva) Fibre Channel standard page on the World Wide Web at http://www.cern.ch/hsi/fcs, and at the Fibre Channel Association's (FCA's) Website at http://www.amdahl.com/ext/carp/fca/fca.htm. Further informatoin regarding Tachyon can be found in Hewlett Packard's "Tachyon User's Manual" and at http://tachyon.rose.hp.com/doc.html. To the fullest extent possible, all of the foregoing is incorporated herein by this reference thereto.

Figure 3:
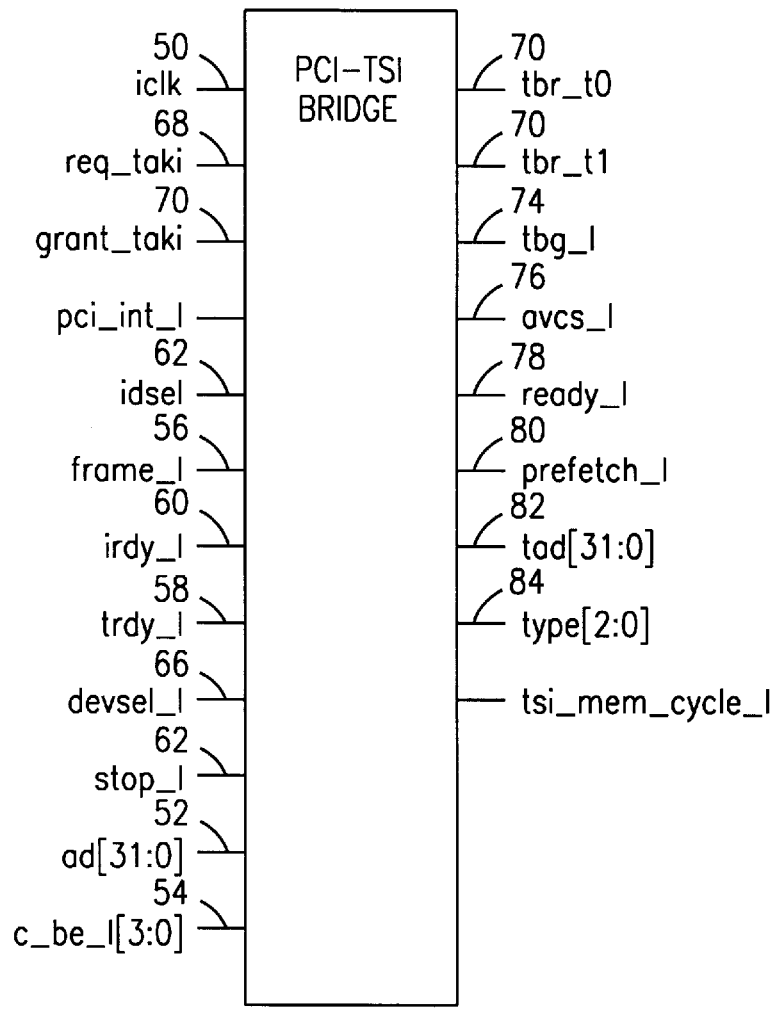
FIG. 3 depicts certain PCI and TSI signals that may appear on opposing sides of a PCI/TSI bridge.

TSI signals include the following:

| | |
|---|---|
| •tbr_t0 tbr_t1 | Which are bus requests (element 72 in FIG. 3). One bus request signal is asserted when Tachyon needs to master a transaction. TBR_T1 indicates a read using the prefetched channel. TBR_T0 is used for writes and non-prefetched reads. |
| •tbg_1 | Which is a bus grant signal (element 74 in FIG. 3). It is asserted low by the host to signal acceptance of a bus request. |
| •avcs_1 | Which is an address valid chip select signal (element 76 in FIG. 3). This signal is driven by the master of a transaction during the address phase. |
| •ready_1 | Which is a device ready signal (element 78 in FIG. 3). It is asserted low by a transaction responder when a transaction is complete. |
| •prefetch_1 | Which is a prefetch request (element 80 in FIG. 3). This original is asserted low by Tachyon to signal that the next request is sequential. This signal may be active during retry. |
| •tad[31:0] | This (element 82 in FIG. 3) signifies multiplexed address/data. |
| •type[2:0] | This (element 84 in FIG. 3) signifies transaction type. This signal is asserted low by the master of a transaction. TYPE indicates the size and direction of the transaction. |

THE INSTANT INVENTION

In general terms, from the foregoing it should be understood that is it desirable to bridge PCI and TSI buses, but that complications arise in the form of necessary data format conversion (big-endian to little-endian), speed conversion (the TSI. bus being much slower than the PCI bus), and need to respect data continuity (which aspect arises because the TSI bus transfers data in bursts, while the device that bridges through to the PCI bus does not know the total length of the transfer, e.g., the total amount of data being sought from system memory). Certain other details regarding the two involved buses also need to be considered here. First, the TSI bus must, by specification, always be the master. Second, while there are signal tools that can be used, the number and content of those signals are also limited by the bus specifications.

With the above understood, a read transaction, during which data is extracted from system memory (i.e., from the PCI to the TSI bus), according to the teachings of the present invention, can now be discussed.

In such a read operation, the TSI side as the master initiates a request. This request is interpreted by the TSI slave 42, and presented to the PCI side through the FIFO 36 and FIFO arbiter 38 blocks. The prefetch signal discussed in the immediately preceding section indicates to the prefetch FIFOs whether to wait for subsequent transfers. Assuming that the prefetch signal is asserted, one of the two prefetch FIFOs will enter an appropriate wait state, and the PCI master, upon completion of FIFO arbiter 38 arbitration, will seek ownership of the PCI bus. Once the PCI bus is gained, a first data transfer will be made. This data transfer will be of the first 8 D-words (i.e., double-words, where there are 4 bytes each corresponding to a specific address, and where bit 31 is the most significant data bit and bit 0 is the least significant data bit), which is the maximum amount that the TSI can indicate it will accept.

More specifically, in the exemplary embodiment described herein, in response to a TSI side request for 8 D-words with prefetch asserted, the PCI-TSI bridge 12 will obtain 16 D-words initially because both prefetch FIFOs 36 are empty. When the first FIFO is empty and the TSI is taking the second 8 D-words, and when prefetch is set again, then the bridge 12 in the exemplary embodiment will get the third 8 D-words. Thus, it should be appreciated that when the prefetch FIFOs 36 are full, PCI wait states are inserted.

At this point it should be understood that there is a possibility, if not a likelihood, that a piece of data greater than 8 D-words is ultimately being sought by the TSI bus; however, if so, that fact cannot be clearly and expressly indicated by the TSI bus. Here though, in accordance with the teachings of the present invention, rather than release the PCI bus upon a first delivery of data, the PCI bus will wait to see if the TSI bus comes back with a second/subsequent address (AD & 32), together with continued assertion of the prefetch signal. If so, the PCI bus will immediately fetch and transfer a second/subsequent block of contiguous data. By this mechanism, the PCI bus can present a steady stream of data to the TSI bus, notwithstanding the fact that the TSI bus cannot easily request such a stream.

Figure 4:
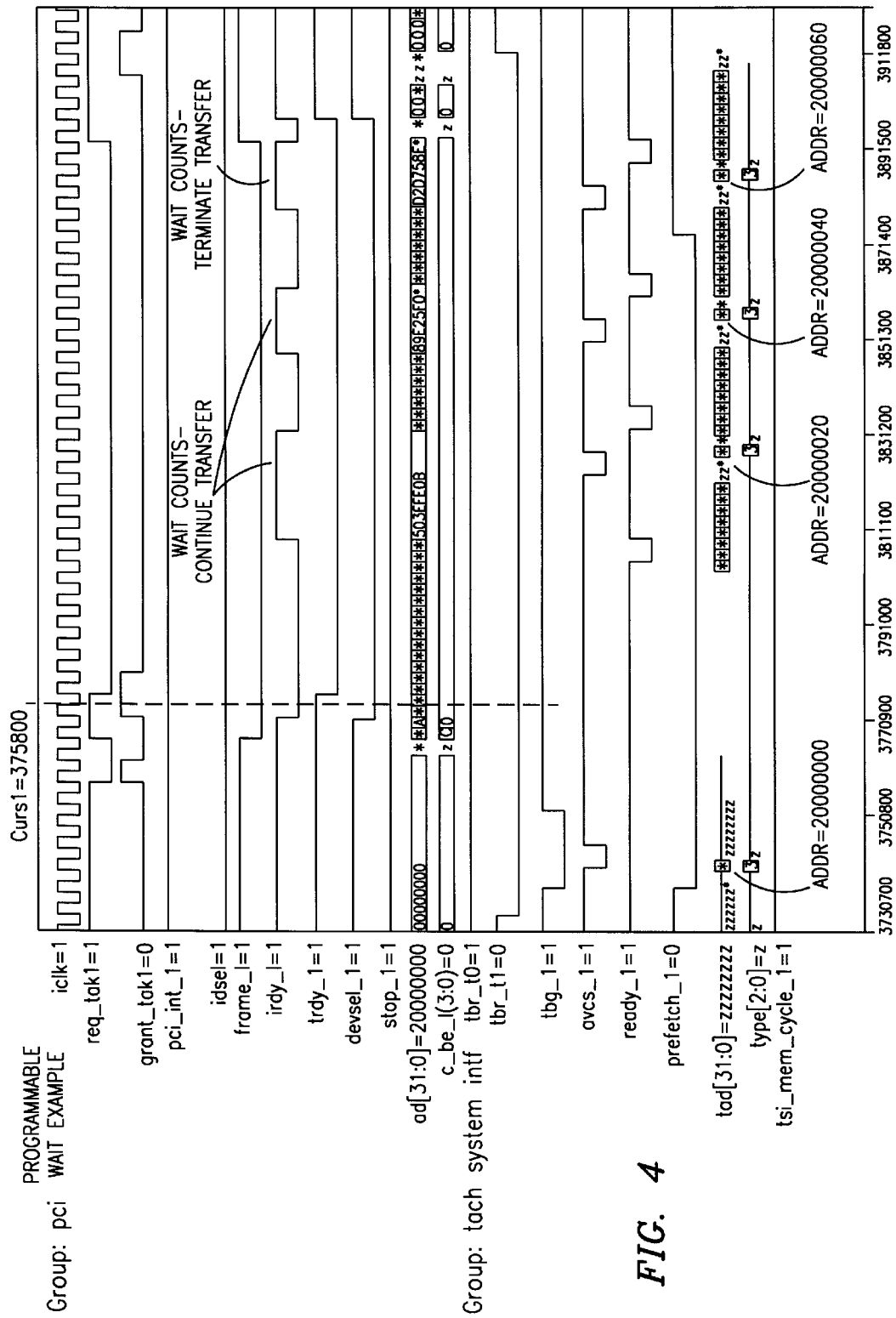
FIG. 4 is a timing diagram depicting operation, at the signal level, of programmable waiting according to the teachings of the present invention.

Monitoring of wait counts in the exemplary embodiment is performed by the PCI master. If second and subsequent addresses and prefetch signals continue to be made, the PCI master continues transferring data to the TSI bus. The wait count is programmable in the exemplary embodiment. If and when the unit count expires, and the TSI bus does not "come back" as described above, the PCI master can disconnect from the PCI interface, to meet PCI specification requirements. A timing diagram showing the waiting and eventual disconnect process is set forth in FIG. 4.

Based upon all of the foregoing, it should now be understood and appreciated how the present invention simply and efficient streams data in circumstances where data travels at different speeds at the two ends of the transfer, and where continuity of data is desirably, but not easily, maintained. By monitoring select signals, and by waiting a set amount of time, which can be made programmable for ease of use in various different applications, the present invention enables efficient use of bandwidth and increased performance characteristics in transfer operations.

While the embodiments described herein involve bridging PCI and TSI buses, any environment in which a data bridge may be usefully employed can be an environment in which apparatus and methods such as those taught herein may be incorporated. Likewise, while a read transfer from a fast bus to a slow bus is described herein, the instant invention may be employed in write transactions also, and/or in transfers from slow to fast buses.

Although a preferred embodiment of the present invention has been illustrated in the accompanying Drawings and described in the foregoing detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system for transferring data between a Tachyon System Interface (TSI) bus and a Peripheral Component Interconnect (PCI) bus, said system for transferring comprising:

a TSI slave circuit for receiving a read request from the TSI bus;

FIFO circuitry connected to said TSI slave circuit for providing a prefetch signal; and a PCI master circuit for receiving said prefetch signal from said FIFO circuitry and for obtaining ownership of said PCI bus and maintaining said ownership for a programmable period of time based on a wait count.

2. The system for transferring data of claim 1, wherein said FIFO circuitry comprises a prefetch FIFO connected to said TSI slave and a FIFO arbitrator circuit connected between said prefetch FIFO and said PCI master circuit.

3. The system for transferring data of claim 1, wherein said prefetch signal indicates that said FIFO circuitry should wait for more than one data transfer from said PCI bus.

4. The system for transferring data of claim 1, wherein once said PCI master obtains control of said PCI bus a first data transfer is made, said first data transfer comprises a maximum of 8 D-words.

5. A PCI-TSI bridge circuit for communicating data from a PCI bus to a TSI bus, said PCI-TSI bridge circuit comprising:

a TSI slave circuit connected to said TSI bus;

a prefetch FIFO circuit connected directly to said TSI slave circuit;

a FIFO arbiter circuit connected directly to said prefetch FIFO circuit; and a PCI master circuit connected directly to said FIFO arbiter, said PCI master circuit also being connected to said PCI bus, said PCI master being further configured to obtain ownership of said PCI bus and maintain said ownership for a programmable period of time based on a wait count, and wherein said TSI slave receives a request from said TSI bus to read data from said PCI bus.

6. The PCI-TSI bridge circuit of claim 5, wherein said PCI-TSI bridge circuit will obtain 16 D-words from said PCI bus and place said D-words in said prefetch FIFO circuit in response to said request.

7. A computer networking system having a data bridging subsystem for transferring data between a Tachyon System Interface (TSI) bus and a Peripheral Component Interconnect (PCI) bus, said data bridging subsystem for transferring comprising:

a TSI slave circuit for receiving a read request from the TSI bus;

FIFO circuitry connected to said TSI slave circuit for providing a prefetch signal; and a PCI master circuit for receiving said prefetch signal from said FIFO circuitry and for obtaining ownership of said PCI bus and maintaining said ownership for a programmable period of time based on a wait count.

8. The computer networking system of claim 7, wherein in said data bridging subsystem for transferring data said FIFO circuitry comprises a prefetch FIFO connected to said TSI slave and a FIFO arbitrator circuit connected between said prefetch FIFO and said PCI master circuit.

9. The computer networking system of claim 7, wherein in said data bridging subsystem for transferring data said prefetch signal indicates that said FIFO circuitry should wait for more than one data transfer from said PCI bus.

10. The computer networking system of claim 11, wherein, in said data bridging subsystem for transferring data, once said PCI master obtains control of said PCI bus a first data transfer is made, said first data transfer comprises a maximum of 8 D-words.

11. A Computer networking and data transfering system comprising a PCI-TSI bridge circuit for communicating data from a PCI bus to a TSI bus, said PCI-TSI bridge circuit comprising:

a TSI slave circuit connected to said TSI bus;

a prefetch FIFO circuit connected directly to said TSI slave circuit;

a FIFO arbiter circuit connected directly to said prefetch FIFO circuit; and a PCI master circuit connected directly to said FIFO arbiter, said PCI master circuit also being connected to said PCI bus, said PCI master being further configured to obtain ownership of said PCI bus and maintain said ownership for a programmable period of time based on a wait count, and wherein said TSI slave receives a request from said TSI bus to read data from said PCI bus.

* * * * *